United States Patent [19]

Specht

[11] 4,117,772
[45] Oct. 3, 1978

[54] VENTED WINDOW ASSEMBLY FOR AUTOMOTIVE VEHICLES

[75] Inventor: Paul B. Specht, Wilmette, Ill.

[73] Assignee: International Telephone and Telegraph Corporation, New York, N.Y.

[21] Appl. No.: 773,434

[22] Filed: Mar. 1, 1977

[51] Int. Cl.$^2$ ............................................. B60H 1/24
[52] U.S. Cl. ......................................... 98/2; 98/2.12; 98/2.16; 98/2.18; 98/8
[58] Field of Search .................. 98/2, 2.12, 2.13, 2.16, 98/2.17, 2.18, 2.19, 8, 13, 18, 2.14

[56] References Cited

U.S. PATENT DOCUMENTS

| | | | |
|---|---|---|---|
| 2,070,113 | 2/1937 | Burgess | 98/2.16 |
| 2,443,454 | 6/1948 | Hennessy | 98/2.16 |
| 2,885,941 | 5/1959 | Allen | 98/2.17 |
| 3,012,812 | 12/1961 | Miller, Jr. | 98/2.18 |
| 3,046,865 | 7/1962 | Kelly | 98/2.18 |
| 3,456,571 | 7/1969 | Kelly et al. | 98/2.18 |
| 3,672,291 | 6/1972 | Kujawa, Jr. | 98/2.16 |
| 3,763,760 | 10/1973 | Erickson | 98/2.16 |
| 3,839,950 | 10/1974 | Kelly et al. | 98/2.16 |

*Primary Examiner*—Henry C. Yuen
*Attorney, Agent, or Firm*—James B. Raden; William J. Michals

[57] ABSTRACT

A vented window assembly which is particularly suitable for use in rear-seat position, quarter window panels of compact automobiles. The assembly preferably includes a frame having an outline or perimeter which is compatible with the outline of the normal fixed quarter window panel. A substantially transparent window member is fastened to the frame and within the perimeter thereof. A vent housing is fixedly mounted between the frame and the window member and provides a passageway therein extending on opposite sides of the frame, from the interior to the exterior of the vehicle. A vent member sealingly engages, and is movably mounted within, the passageway of the vent housing for selectively opening the passageway. The passageway is opened into a first direction along one side of the frame which corresponds to the moving direction of the vehicle and thereby provides an intake vent. The vent member is rotatable into a second direction wherein the passageway opens in to a direction which is substantially opposite to that of the first direction and thereby provides an exhaust vent. The vent assembly is also rotatable into an intermediate position which substantially closes the passageway. The vent assembly can be similarly installed at any suitable body panel portion of the vehicle.

1 Claim, 7 Drawing Figures

VENTED WINDOW ASSEMBLY FOR AUTOMOTIVE VEHICLES

BACKGROUND OF THE INVENTION

This invention relates to a vent assembly for automotive vehicles and, more particularly, to a vented window assembly suitable for use in quarter window panels of compact automobiles.

The art of automotive passenger compartment environmental control systems is well-developed. Improvements have been made both in terms of heating and cooling particularly in view of the wide-spread adoption of air-conditioning and the present-day ability to provide effective sealing of automotive doors and the windows therein. However, these prior art systems suffer with disadvantages particularly in compact or two-door, five-passenger automobile applications. That is, essentially all air modification system elements are located forward of the vehicle at the fire wall position, including the system output vents. While these systems serve the driver and front-seat passengers well, they fail to effectively accommodate the rear-seat passengers, particularly in those two-door compact automobiles with fixed or permanently closed quarter panel windows.

These prior art systems rely upon a power-driven air volume or mass, which originates at the instrument panel or fire wall positions, to provide the heating, cooling and outside air venting functions. In order to accomodate the rear seat positions, the air flow must travel on the order of five times the nominal front-seat distance, and therefore necessitates considerable air velocities and nevertheless results in pressure and temperature drops in the rear seat positions. Air flow obstructions, such as head rests and the like, intervene to deflect, and reduce the velocity of, the driven air which further aggravates the problem of air distribution, and typically results in a random rear compartment air dispersion. Attempts to equalize the overall passenger compartment environment necessitates high or low temperature extremes at the system output elements provided on the instrument panel or firewall. Consequently, the comfort of the front seat passenger must be sacrificed in order to accommodate the rear seat passenger and undesired stratification compartment temperature differentials typically results. Further, these prior art systems require some form of relief of venting in order to achieve an overall effective air flow from the front to the rear portions of the vehicle compartment. This relief venting is not readily achieved in the case of two-door, five-passenger compact automobiles with fixed or permanently closed quarter panel windows.

These prior art disadvantages are particularly acute in the case of the compact automobiles because of the psychological factors affecting the rear seat passengers. That is, because of the initially cramped conditions coupled with little or no control over individual personal environment, the rear seat passenger must helplessly, if not claustrophobicly, rely upon, and is subject to, negotiation with the front-seat passenger occupants to modify his environment.

These and other disadvantages are overcome by the present invention wherein a vented window assembly is provided which facilitates, notably, individual air control in the rear seat passenger positions. The invention provides a flexible or adaptive unit assembly which is weather sealed in all modes of operation and which selectively provides intake, exhaust or closed system modes. The undesired effects of road noise which could otherwise be introduced during a vented mode of operation are substantially eliminated by the provision of suitable noise dampening or attenuation means. Accordingly, the present invention provides individual personal environment control which may be readily added to present-day air modification systems for automotive vehicles, thereby adding an additional dimension thereto.

SUMMARY OF THE INVENTION

Briefly, a vented window assembly for use with automotive vehicles is provided. The assembly includes a window frame wherein a substantially transparent window member is fastened to the frame and within the perimeter thereof. The vent housing is fixedly mounted between the frame and the window member and provides a passageway therein extending on opposite sides of the frame. A vent member sealingly engages and is movably mounted within the passageway of the housing. The vent member selectively opens the passageway into a first direction along one side of the frame and into a second direction which is substantially opposite that of the first direction and to substantially close the passageway.

BRIEF DESCRIPTION OF THE DRAWING

The advantages of this invention will become more readily appreciated as the same becomes better understood by reference to the following detailed description when taken in conjunction with the accompanying drawing wherein.

DETAILED DESCRIPTION

Figure 1:
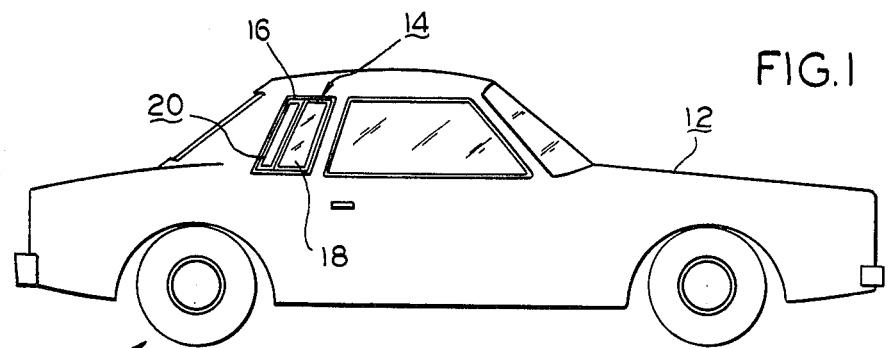
FIG. 1 is a side view of a typical compact-sized automobile utilizing a vented window assembly in accordance with the principles of the present invention.
Figure 2:
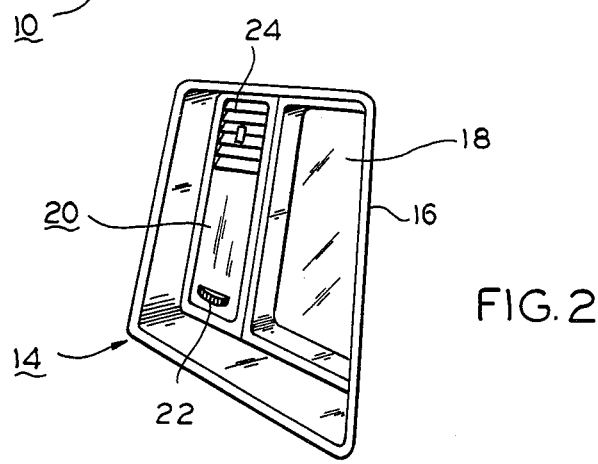
FIG. 2 is an enlarged inside view of a vented window assembly suitable for use in the vehicle illustrated in FIG. 1.
Figures 3, 4:
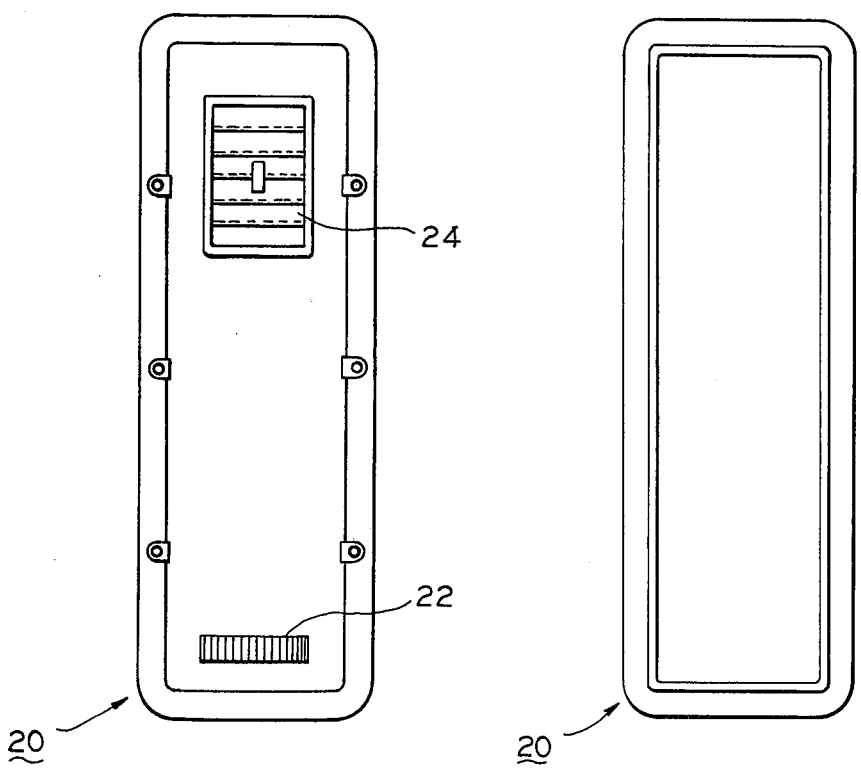
FIGS. 3 and 4 provide inside and outside views, respectively, of the vent assembly in accordance with the present invention; and, FIGS. 5–7 provide cross-sectional views of a vent assembly of the type depicted in FIGS. 3 and 4 and illustrate the three basic modes of operation of the vent assembly in accordance with the principles of the present invention.

Referring now to FIG. 1, there is shown generally at 10 a two-door, five-passenger compact-sized automobile 12 which includes a vented window assembly 14 in accordance with the present invention. It can be seen that assembly 14 is mounted in and has the outline of a conventional quarter panel window opening. Assembly 14 includes a frame 16, a transparent window member 18 and a vent assembly 20 as will be described more fully hereinafter. Referring now to FIG. 2 there is shown an inside view of assembly 14 of FIG. 1 as would be observed from the inside or internally of the passenger compartment of vehicle 12 of FIG. 1. It can be seen that vent assembly 20 includes a control knob 22 for providing the desired mode of operation and a directional shutter 24 which is used to deflect or control the direction of the intake or exhaust air provided by vent assembly 20. Referring now FIGS. 3 and 4 there are provided, respectively, inside and outside views of vent assembly 20 of the previous drawing figures. FIG. 4 illustrates the vent assembly when it is in the closed or off mode. It can be seen that in the off mode, assembly 20 provides a flat or flush exterior which generally resides in the plane of window member 18 of FIGS. 1 and 2. Accordingly, the streamlined contour of vehicle 12 is maintained when vent assembly 20 is in the off or closed mode.

Figure 5:
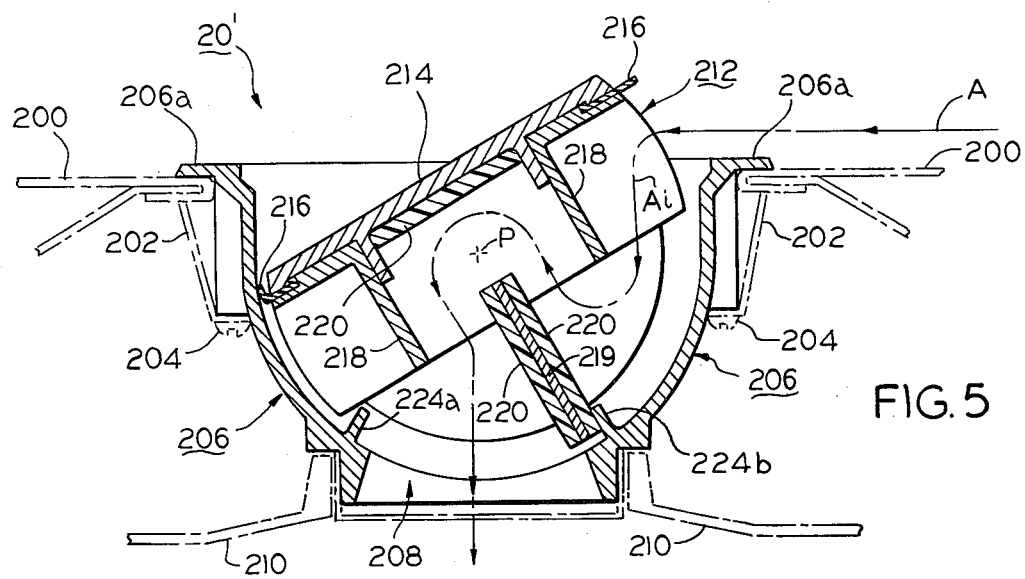
Figure 6:
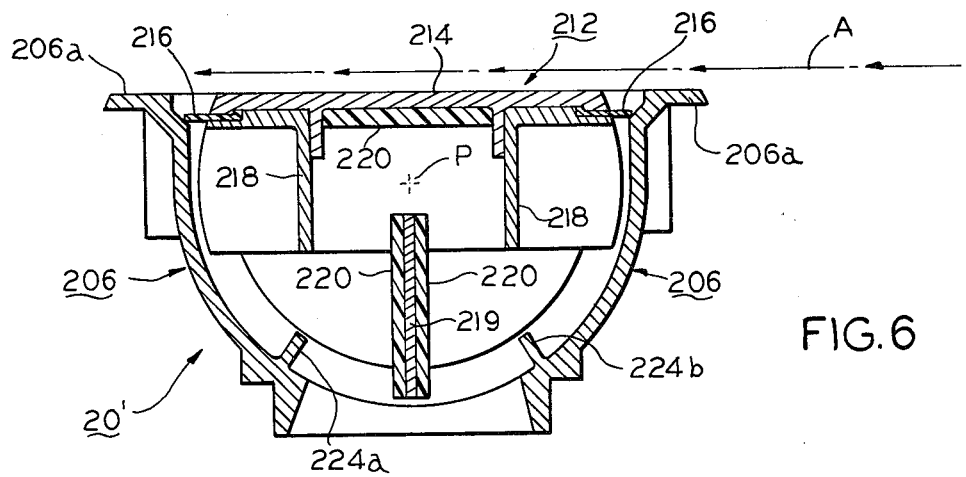
Figure 7:
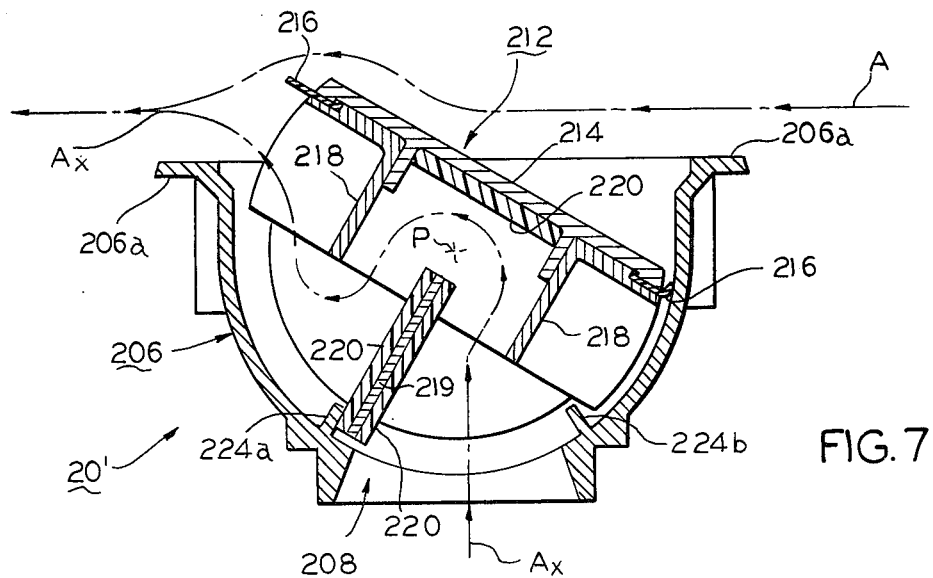

Referring now to FIGS. 5, 6 and 7 there is depicted therein a vent assembly 20' which differs from vent assembly 20 of the previous drawing figures with respect to the mounting configuration. That is, vent assembly 20' of FIGS. 5-7 is shown mounted directly to a body panel member 200 of an automobile rather than adjacent to a window member as illustrated in the previous drawing figures. FIGS. 5-7 do illustrate the three basic modes of operation of the automotive vent assembly in accordance with principles of the present invention. FIGS. 5-7 provide cross-sectional views of vent assembly 20' as would be taken along the cylindrical or tubular configuration of the vent member.

Vent assembly 20' is mounted to body panel 200 as by means of clips 202 and suitable fasteners such as screws 204. It can be seen that the body or housing 206 of vent assembly 20' is provided with mounting flange portions 206a which may be sealed against body panel 200 by any suitable means as is conventional in the art. It can be seen that housing 206 is provided with a passageway which extends from externally of the vehicle and terminates internally of the vehicle as at opening 208 which is adjacent interior finish trim members 210. Rotatably mounted within housing 206 is a vent member 212 which is pivotably mounted about point P. It can be seen that vent member 212 is generally tubular or cylindrical except at flat portion 214 which extends substantially from end to end of vent member 212 and exhibits a width approximately equal to the width of the external opening of the passageway of vent housing 206. Vent member 212 includes an opening intermediate its ends thereof which provides a secondary passageway for selectively opening and closing the external opening of vent housing 206. Vent member 212 further includes sealing means such as gaskets 216 which slidably engage the inner walls of vent housing 206 to provide a substantially leak-proof seal between the external and internal openings of passageway of vent housing 206. These gaskets are also effective when vent member 212 is in its closed position as illustrated in FIG. 6.

Vent member 212 is further provided with a plurality of baffles such as 218 and 219 which extend radially inwardly from the inner walls of vent member 212. Baffle members 218 and 219 may be integrally formed with vent member 212 or may comprise individual parts which are assembled with the main structure of vent member 212. Vent member 212 is further provided with sound absorbing or attenuating members such as plastic foam strips 220. This sound dampening or attenuation means functions to reduce the level of external road noises and any additional noises otherwise created by the passage of air through vent assembly 20'. Finally, vent housing 206 is provided with a pair of radially inwardly and circumferentially spaced stop members 224a and 224b.

The function of vent assembly 20' of FIGS. 5-7 will now be described. It is assumed that vent assembly 20' is mounted to a moving vehicle which is moving in the direction from left to right in FIGS. 5-7. The resulting air travel or air stream is represented by laminar flow line A. Referring now to FIG. 5 it can be seen that vent member 212 is positioned such that the right-hand portion of vent member 212 functions as an air scoop to divert air stream A into and through the passageway provided in housing 206. The mode represented by FIG. 5 provides an intake scoop wherein the air traveling through vent assembly 20' is represented by the intake air flow line $A_i$. It can be seen that once vent member is rotated into the desired air-intake position, further rotation of vent member 212 is precluded by stop 224b.

Conversely, when it is desired to operate vent assembly 20' in the exhaust mode, vent member 212 is rotated into the position illustrated in FIG. 7. It can be seen that the air stream A flows over the externally projecting end of vent member 212 and thereby creates a pressure drop in the externally protruding area of vent member 212. Accordingly, air is exhausted from internally of the vehicle passenger compartment through the passageways in housing 206 and externally of the vehicle as illustrated by exhaust air flow line $A_x$. Finally, FIG. 6 illustrates the selected position which provides a completely sealed closure between the external and internal passageway openings of housing 206.

It will be appreciated by those skilled in the art that vent member 212 can be manually operated such as by means of knurled knob 22 of FIG. 3. It will also be appreciated that any other remote control means, with or without a driven electrical motor or solenoid device, can be advantageously utilized to selectively rotate vent member 212 into its various operating mode positions. Further various geometric configurations can be utilized in the air path within vent member 212. For example, volume expansion or reduction can be provided in order to attain given air flow characteristics.

What has been taught, then, is a vent assembly which is particularly suitable for use with compact-sized, automobiles and facilitating, notably, personalized local control of the environment of the passenger compartment thereof. The forms of the inventions illustrated and described herein are but preferred embodiments of these teachings, in the forms currently preferred for manufacture. They are shown as illustrations of the inventive concepts, however, rather than by way of limitation, and it is pointed out that various modifications or alterations may be indulged in within the scope of the appended claims.

What is claimed:

1. A vented window assembly for use with automotive vehicles comprising, in combination:
   a window frame;
   a substantially transparent window member fastened to said frame within the perimeter thereof;
   a vent housing fixedly mounted between said frame and said window member and providing a passageway therein extending on opposite sides of said frame;
   a vent member sealingly engaging and movable mounted within said passageway of said housing for selectively opening said passageway into a first direction along one side of said frame and into a second direction along said one side which is substantially opposite to that of said first direction, and to substantially close said passageway;
   wherein said vent member is generally cylindrical and is pivotally mounted about its longitudinal axis within said vent housing and wherein said axis of said vent member is substantially perpendicular to said first and second directions;

wherein the generally cylindrical portion of said vent member includes a flat portion extending substantially from end to end thereof and wherein the width of said flat portion is substantially equal to the width of said passageway at said one side of said frame whereby the surface of said assembly is substantially flush when said vent member closes said passgeway;

wherein said vent member includes first and second longitudinally extending openings along said generally cylindrical surface portion respectively disposed adjacent said flat portion along opposite sides thereof; and, wherein said vent member includes a plurality of partitions extending radially inwardly from the inner walls thereof.

* * * * *